M. M. FREEMAN.
MILK COOLER.
APPLICATION FILED AUG. 24, 1910.
986,276.
Patented Mar. 7, 1911.
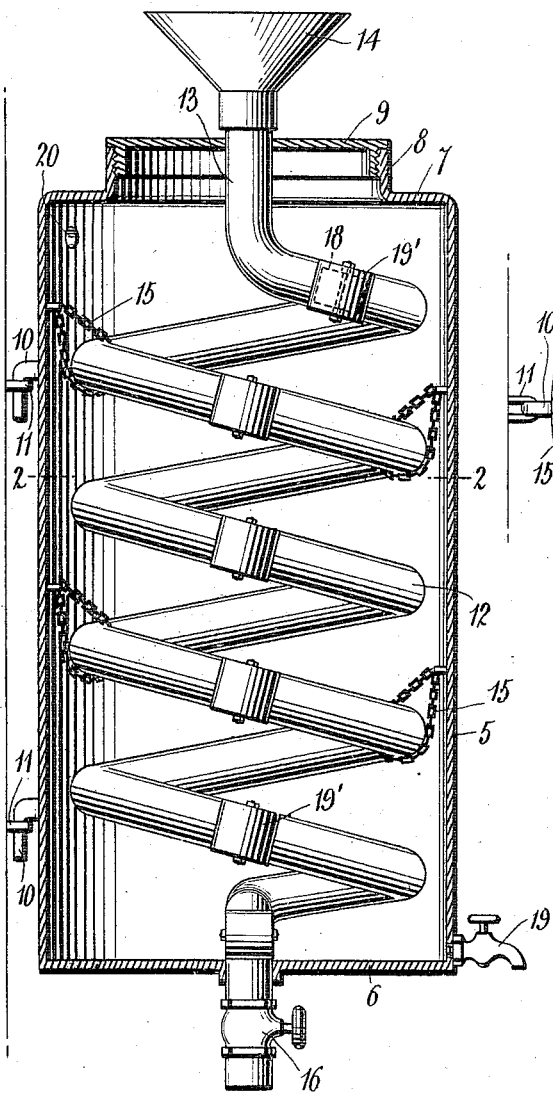
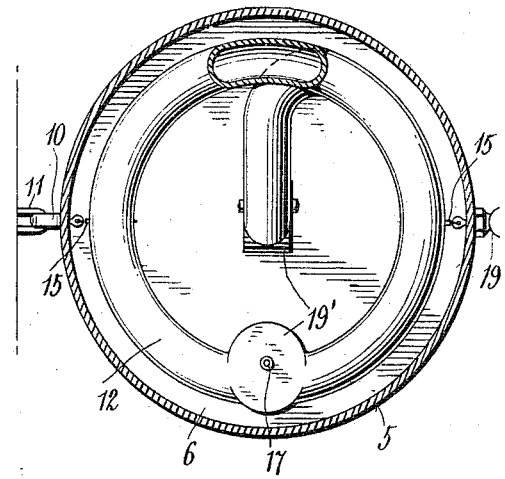
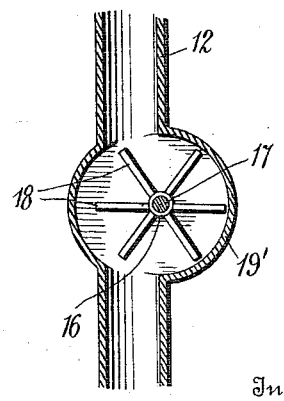
Inventor
Mabel M. Freeman.
Witnesses
By
Attorneys

UNITED STATES PATENT OFFICE.

MABEL M. FREEMAN, OF PALMS, CALIFORNIA.

MILK-COOLER.

986,276.

Specification of Letters Patent.　　Patented Mar. 7, 1911.

Application filed August 24, 1910.　Serial No. 578,609.

*To all whom it may concern:*

Be it known that I, MABEL M. FREEMAN, a citizen of the United States, residing at Palms, in the county of Los Angeles, State of California, have invented certain new and useful Improvements in Milk-Coolers; and I do hereby declare the following to be a full, clear, and exact description of the invention, such as will enable others skilled in the art to which it appertains to make and use the same.

This invention relates to improvements in milk coolers of that type adapted to be used in homes for quickly cooling milk.

One of the objects of the present invention is the construction of a milk cooler which can be manufactured cheaply, is simple in operation and which comprises a cold water containing cylinder in which a milk cooling tube is arranged, the tube having an inlet hopper on its upper end above the containing cylinder and a discharge on its lower end and being provided with devices located in the bore of the tube or pipe whereby the flow of the milk to be cooled will be retarded.

With the above and other objects in view the invention consists in certain combinations, constructions and arrangements of parts clearly described in the following specification and clearly illustrated in the accompanying drawings, in which, Figure 1 is a vertical central sectional view showing the interior construction of the improved milk cooler. Fig. 2 is a transverse sectional view taken on the line 2—2 of Fig. 1; and Fig. 3 is a detail sectional view illustrating one of the devices for retarding the flow of milk through the cooling tube.

Referring to the accompanying drawings, 5 denotes a cold water containing cylinder having a bottom 6 and a top 7 which is formed with a circular flange 8 adapted to receive a screw threaded cover or cap 9. The cylinder 5 is provided with supporting hooks or brackets 10 adapted to engage with screw eyelets 11 which may be secured to a wall or other support.

Within the cold water cylinder 5 a helical cooling tube or pipe 12 is arranged, said pipe being formed with a pitch adapted to allow for the ready flow of the milk to be cooled. The upper end of the tube or pipe 12 is vertically disposed to form an intake 13 and a hopper 14 is screw threaded on said end 13. The pipe or tube 12 is suitably supported on the wall of the cylinder 5 by means of brackets or chains 15. The lower end of the tube or pipe 12 is disposed vertically and extends through the bottom 6 to form a discharge and said lower end is provided with a shut-off valve 16.

In order to retard the flow of milk through the cooling tube or pipe 12 a series of rotating baffles or wheels 16 are pivotally arranged within the bore of the tube or pipe upon shafts 17, said baffles or wheels being provided with broad radiating spokes or wings 18. The pipe or tube 12 is formed with offset portions 19' for the reception of the baffles or wheels 16 and the shafts 17 are pivoted in said offset portions so that the milk flowing through the pipes will strike only one-half of the spokes or wings, whereby the pressure of the flowing milk will be exerted in one direction on the baffles or wheels and practically no back pressure will be produced. The shafts 17 may be provided with adjusting means arranged to bear against the outer side of the pipe or tube 12 whereby the brackets on the shafts may be increased or decreased and the speed with which the baffles or wheels rotate can be modified so as to retard or facilitate the flow of milk through the cooling tube or pipe. A drain valve or faucet 19 is secured on the lower part of the cylinder 5 and the upper part of the cylinder may be provided with an inlet opening 20, which may be connected with a suitable water supply pipe so that water may be supplied to the cylinder 5 in a constant stream; in which case the drain valve or faucet 19 would be kept constantly open.

When the cylinder 5 has been filled with cold water or other cooling fluid and the shut-off valve 16 is opened, milk may be passed through the cooling tube 12 so that the same will be quickly cooled. A suitable receiving vessel being positioned below the discharge on the lower end of the cooling tube or pipe to receive the cooled milk.

The improved device will be found especially useful for rapidly cooling milk in homes and such places, as it comprises a very limited number of parts, each of simple construction, it can be manufactured and sold very cheaply, while owing to its extreme simplicity no difficulty will be encountered in operating the same.

What is claimed is:—

1. In a milk cooler, a cold water containing cylinder, a milk cooling tube helically disposed in the cylinder and provided with an intake end projecting through the cover of the cylinder and the discharge end projecting through the bottom of the cylinder, and a series of baffles movable in the cooling tube for retarding the flow of the milk to be cooled through the tube.

2. In a milk cooler, a cold water containing cylinder, a milk cooling tube helically disposed in the cylinder and provided with an intake and a discharge end extending through the cylinder, and a series of rotating wheels arranged within the bore of the tube and adapted to retard the flow of milk through the tube.

In testimony whereof, I affix my signature, in presence of two witnesses.

MABEL M. FREEMAN.

Witnesses:
GEO. W. HARMER,
Mrs. C. L. HARRIS.

---

Copies of this patent may be obtained for five cents each, by addressing the "Commissioner of Patents, Washington, D. C."